United States Patent
Lee et al.

(10) Patent No.: US 10,469,154 B2
(45) Date of Patent: Nov. 5, 2019

(54) METHOD FOR PERFORMING MANAGEMENT OF LOCAL ID IDENTIFYING A REMOTE UE IN A RELAY UE IN WIRELESS COMMUNICATION SYSTEM AND A DEVICE THEREFOR

(71) Applicant: LG ELECTRONICS INC., Seoul (KR)

(72) Inventors: Jaewook Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/939,906

(22) Filed: Mar. 29, 2018

(65) Prior Publication Data

US 2018/0287689 A1    Oct. 4, 2018

Related U.S. Application Data

(60) Provisional application No. 62/478,609, filed on Mar. 30, 2017.

(51) Int. Cl.
| | |
|---|---|
| H04J 3/08 | (2006.01) |
| H04B 7/14 | (2006.01) |
| H04W 48/16 | (2009.01) |
| H04W 76/27 | (2018.01) |
| H04W 8/26 | (2009.01) |
| H04W 88/04 | (2009.01) |

(52) U.S. Cl.
CPC .............. *H04B 7/14* (2013.01); *H04W 8/26* (2013.01); *H04W 48/16* (2013.01); *H04W 76/27* (2018.02); *H04W 88/04* (2013.01)

(58) Field of Classification Search
CPC .......... H04B 7/14; H04W 76/27; H04W 8/26; H04W 48/16
USPC ......................... 370/315–330, 338, 345–348
See application file for complete search history.

(56) References Cited

U.S. PATENT DOCUMENTS

| | | | | |
|---|---|---|---|---|
| 2010/0260096 | A1* | 10/2010 | Ulupinar | H04B 7/2606 370/315 |
| 2017/0142653 | A1* | 5/2017 | Qi | H04B 7/2606 |
| 2017/0325270 | A1* | 11/2017 | Tenny | H04W 12/06 |
| 2018/0109308 | A1* | 4/2018 | Leroux | H04B 7/14 |
| 2019/0028994 | A1* | 1/2019 | Tenny | H04W 64/003 |
| 2019/0059015 | A1* | 2/2019 | Lee | H04W 28/02 |

\* cited by examiner

*Primary Examiner* — Thai D Hoang
(74) *Attorney, Agent, or Firm* — Birch, Stewart, Kolasch & Birch, LLP

(57) ABSTRACT

The present invention relates to a wireless communication system. More specifically, the present invention relates to a method and a device for performing management of local id identifying a remote UE in a relay UE in wireless communication system, the method comprising: generating a local ID identifying a remote UE of which transmits/receives data to/from a eNB via the relay UE, wherein the generated local ID is derived from RAT specific ID which is acquired during discovery procedure and linking process between the remote UE and the relay UE; receiving RRC connection request message from the remote UE; and transmitting the RRC connection request message for the remote UE using the generating local ID to the eNB.

10 Claims, 17 Drawing Sheets

(a) Control-Plane Protocol Stack (b) User-Plane Protocol Stack

US 10,469,154 B2

METHOD FOR PERFORMING MANAGEMENT OF LOCAL ID IDENTIFYING A REMOTE UE IN A RELAY UE IN WIRELESS COMMUNICATION SYSTEM AND A DEVICE THEREFOR

This application claims the benefit of the U.S. Provisional Patent Applications No. 62/478,609 filed on Mar. 30, 2017 which is hereby incorporated by reference as if fully set forth herein.

BACKGROUND OF THE INVENTION

Field of the Invention

The present invention relates to a wireless communication system and, more particularly, to a method for performing management of local id identifying a remote UE in a relay UE in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
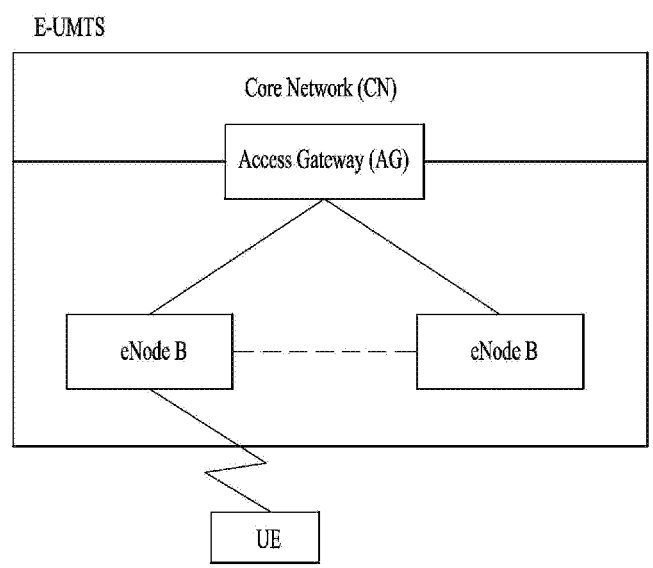
FIG. 1 is a diagram showing a network structure of an Evolved Universal Mobile Telecommunications System (E-UMTS) as an example of a wireless communication system.
Figure 2A:
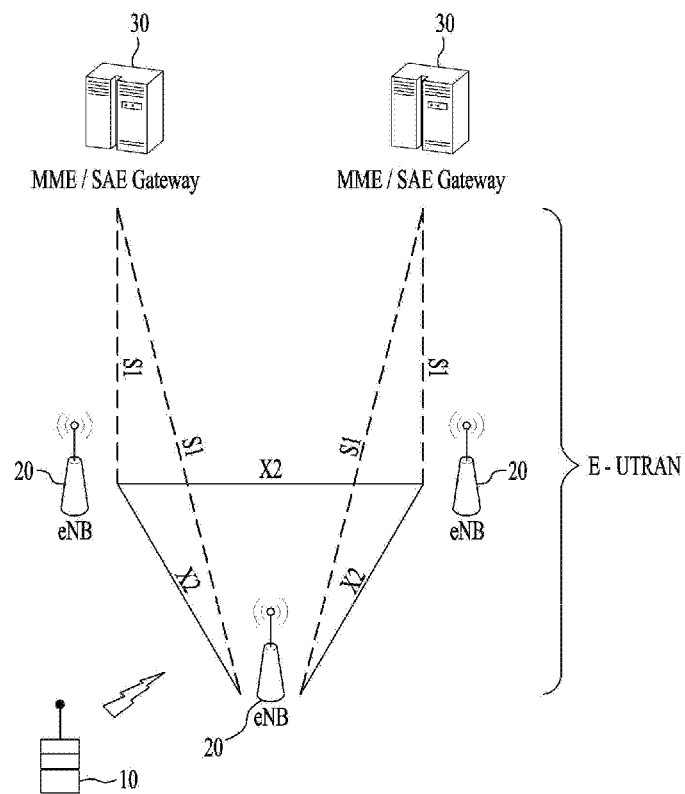
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
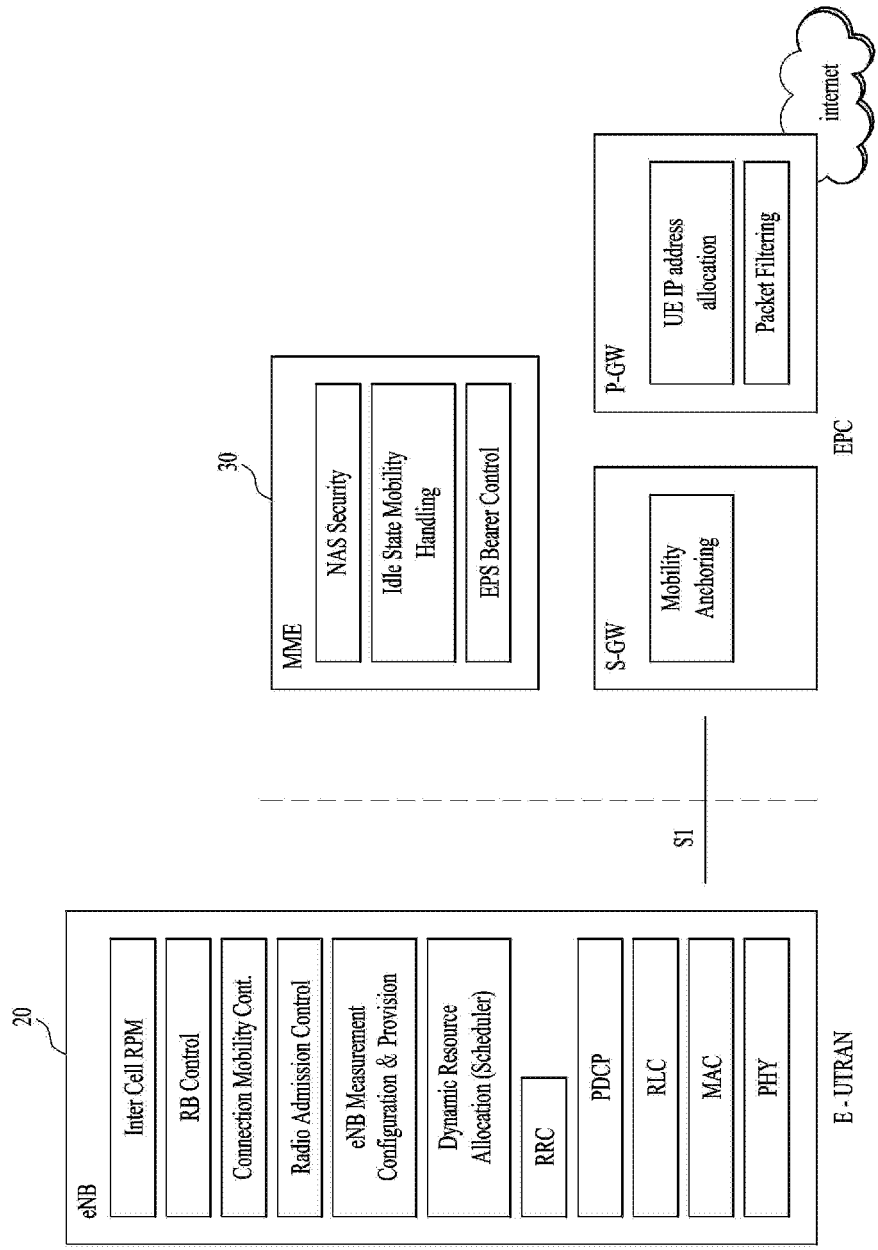
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
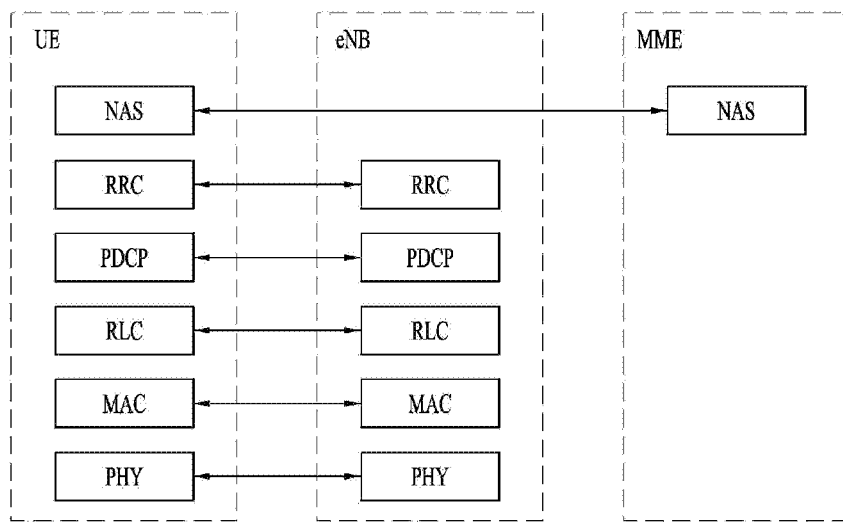
FIG. 3 is a diagram showing a control plane and a user plane of a radio interface protocol between a UE and an E-UTRAN based on a 3rd generation partnership project (3GPP) radio access network standard.
Figure 3:
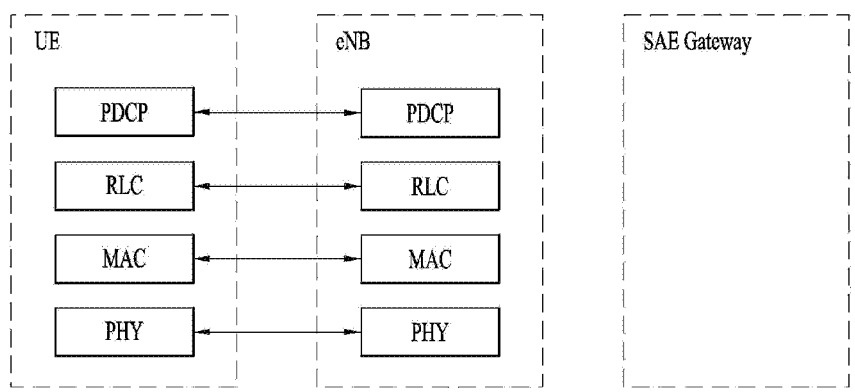

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
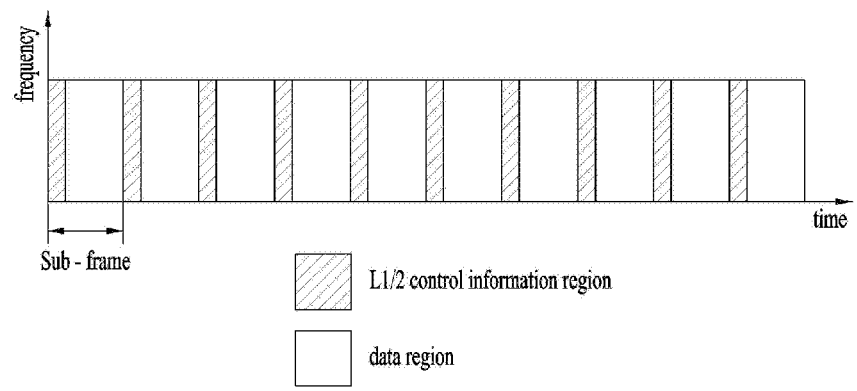
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
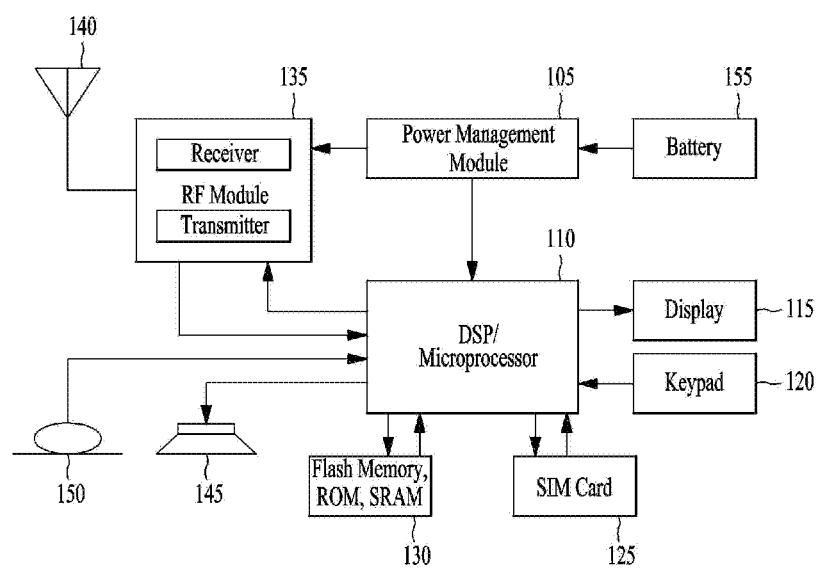
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
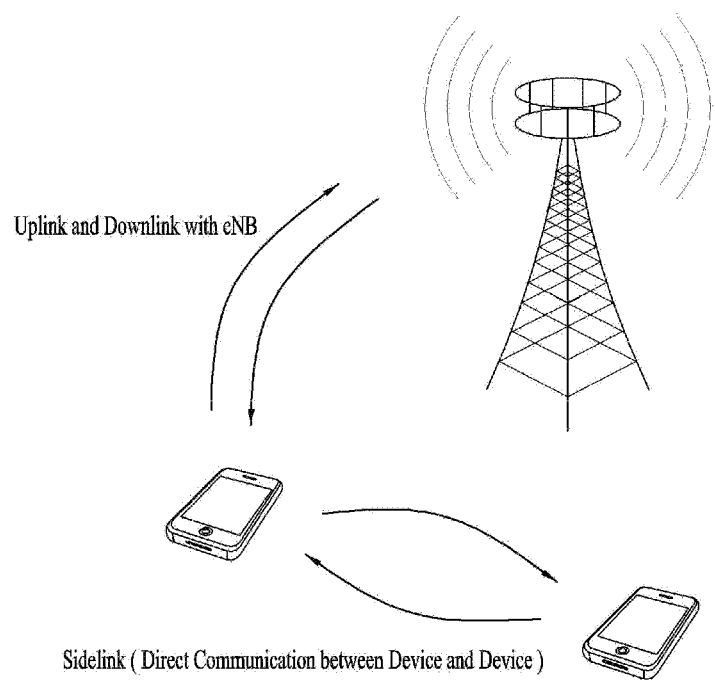
FIG. 6 is a conceptual diagram for sidelink communication.

FIG. 6 is a conceptual diagram for sidelink communication.

Sidelink comprises sidelink discovery, sidelink communication and V2X sidelink communication between UEs.

Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink. PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

The UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:
  i) Uu transmission/reception (highest priority);
  ii) PC5 sidelink communication transmission/reception;
  iii) PC5 sidelink discovery announcement/monitoring (lowest priority).

The UE performs transmission and reception over Uu and PC5 with the following decreasing priority order in case Sidelink Discovery Gap is configured:
  i) Uu transmission/reception for RACH;
  ii) PC5 sidelink discovery announcement during a Sidelink Discovery Gap for transmission;
  iii) Non-RACH Uu transmission;
  iv) PC5 sidelink discovery monitoring during a Sidelink Discovery Gap for reception;
  v) Non-RACH Uu reception;
  vi) PC5 sidelink communication transmission/reception.

Figure 7A:
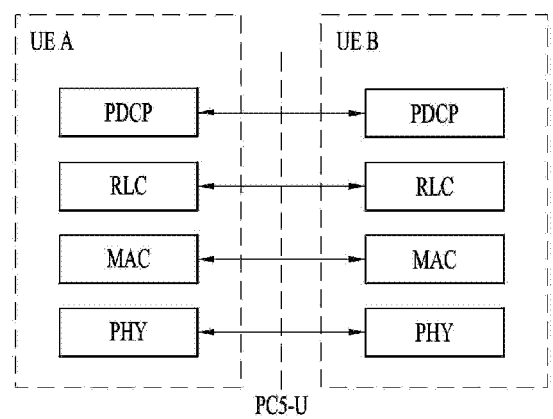
FIG. 7A is a diagram for protocol stack for the user plane of sidelink communication.
Figure 7B:
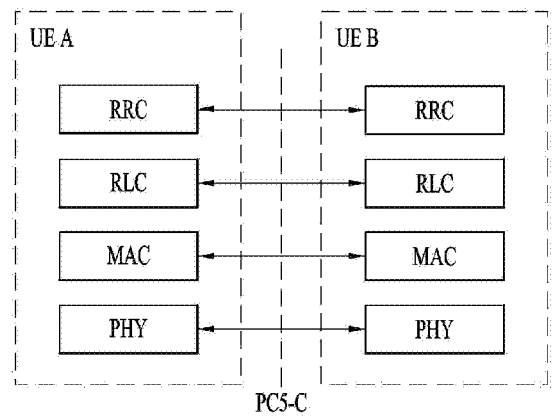
FIGS. 7B and 7C are diagrams for protocol stack for the control plane of sidelink communication.
Figure 7C:
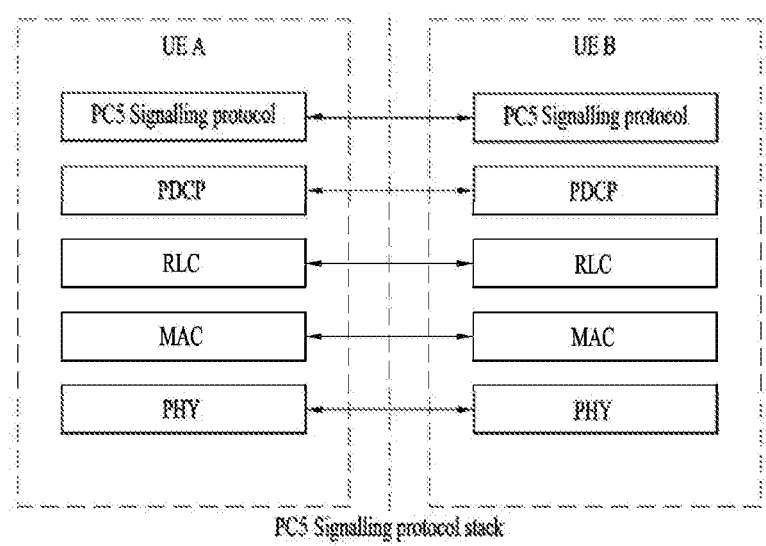

FIG. 7A is a diagram for protocol stack for the user plane of sidelink communication, FIGS. 7B and 7C are diagrams for protocol stack for the control plane of sidelink communication;

FIG. 7A shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7A.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7B.

The control plane for establishing, maintaining and releasing the logical connection for one-to-one sidelink communication is shown in FIG. 7c.

FIGS. 8A to 8D are examples for radio protocol stacks for Layer-2 evolved UE-to-Network relay.

In FIGS. 8A to 8D, a protocol architecture for supporting Layer 2 evolved UE-to-Network Relay UE is given for the user plane and the control plane.

Figure 8A:
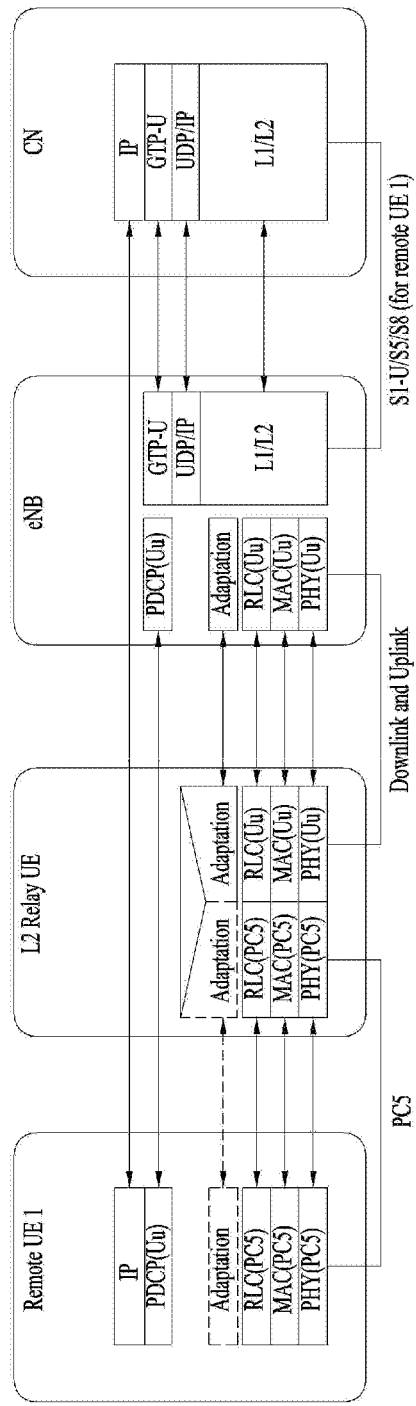
FIGS. 8A to 8D are examples for radio protocol stacks for Layer-2 evolved UE-to-Network relay.
Figure 8B:
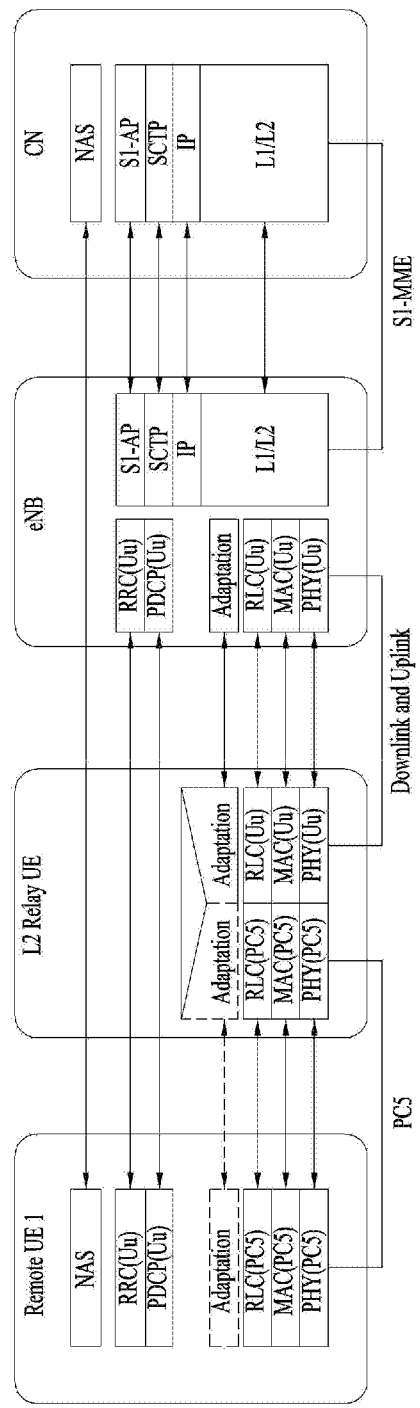
Figure 8C:
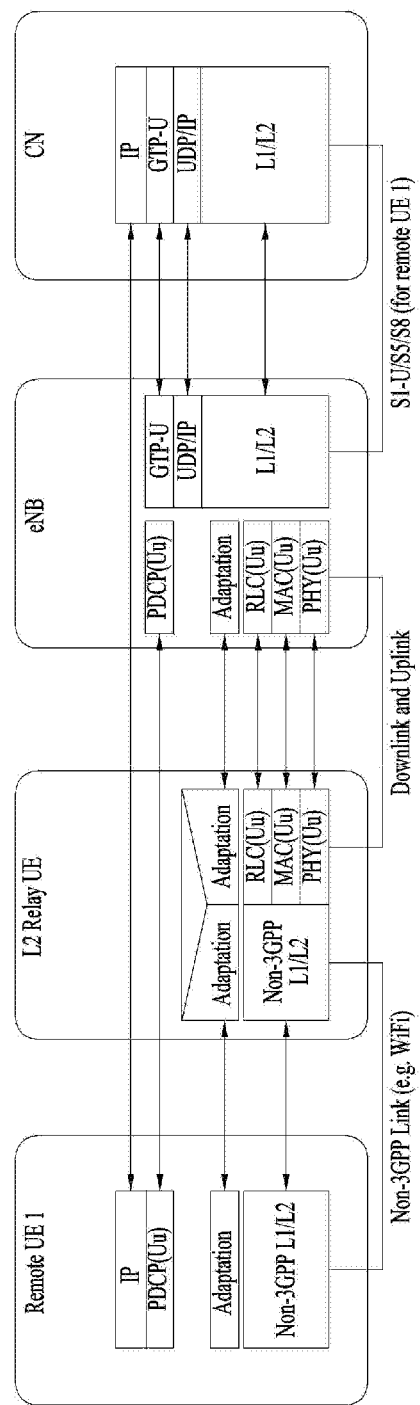
Figure 8D:
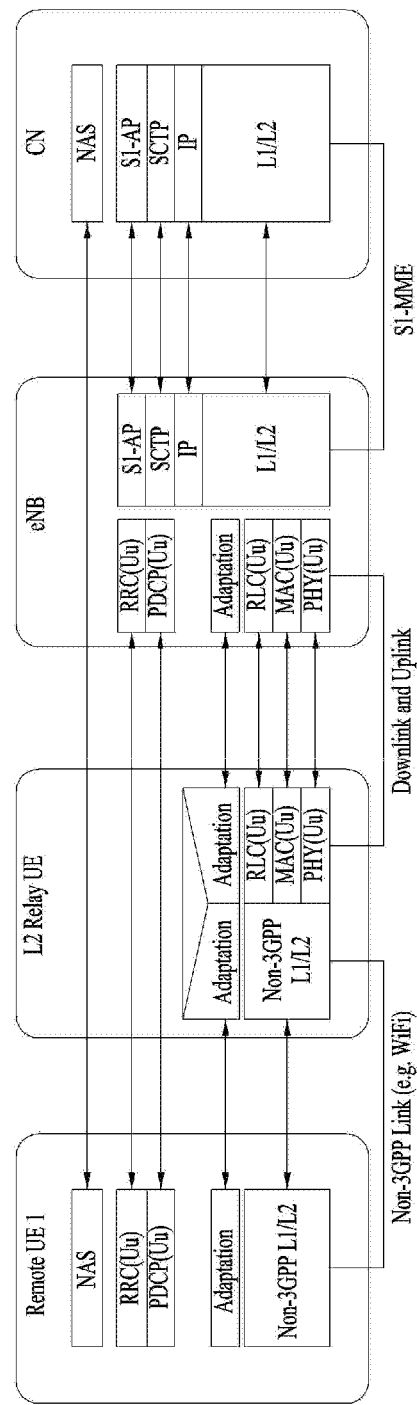

For protocol architecture for the user plane and control plane, relaying is performed above RLC sublayer. The evolved ProSe Remote UE's user plane and control plane data are relayed above RLC via the evolved ProSe UE-to-Network Relay UE from the evolved ProSe Remote UE to network and vice versa. Uu PDCP and RRC are terminated between the evolved ProSe Remote UE and the eNB while RLC, MAC and PHY and the non-3GPP transport layers are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 8A and FIG. 8B. The user plane protocol stack and the control plane protocol stack when non-3GPP access is used between the evolved ProSe remote UE and the evolved ProSe UE-to-Network Relay UE is shown in FIG. 8C and FIG. 8D.

When PC5 interface is used between the evolved ProSe remote UE and the evolved ProSe UE-to-Network Relay UE, by introducing a relay UE for UE-to-network relay, a Remote UE transmits data to an eNB via the Relay UE, and the eNB transmits data to the Remote UE via the Relay UE. I.e., the Relay UE relays data to/from eNB.

As data transfer between the remote UE and the Relay UE is ProSe communication, the Relay UE is communicating with the Remote UE over PC5 interface. In the meantime, as data transfer between the Relay UE and the eNB is a normal uplink/downlink (Uu) communication, the Relay UE is communicating with the eNB over Uu interface.

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorised by upper layers and can be in-coverage of the Public Safety ProSe Carrier or out-of-coverage on any supported carriers including Public Safety ProSe Carrier for UE-to-Network Relay discovery, (re) selection and communication. The ProSe UE-to-Network Relay is always in-coverage of EUTRAN. The ProSe UE-to-Network Relay and the Remote UE perform sidelink communication and sidelink discovery.

A ProSe UE-to-Network Relay performing sidelink communication for ProSe UE-to-Network Relay operation has to be in RRC_CONNECTED. After receiving a layer-2 link establishment request or TMGI monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The Remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

The Remote UE performs radio measurements at PC5 interface and uses them for ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays. Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Within a Uu DRB, different evolved ProSe Remote UEs and different bearers of the evolved ProSe Remote UE are indicated by additional information included in adaptation layer header which is added to PDCP PDU. The evolved ProSe Remote UE is identified in the adaptation layer header on Uu by only local identifier (i.e. an index), which is known to at least the eNB and evolved ProSe UE-to-Network Relay UE. For identifying bearer of the evolved ProSe Remote UE, a bearer identity is indicated by additional information included in adaptation layer header.

For non-3GPP access and PC5, no additional UE identifier needs to be provided by the adaptation layer. The evolved ProSe Remote UE is identified on the short range link by the RAT-specific Layer 2 identifier (i.e. MAC address for non-3GPP access and FFS for PC5). The evolved ProSe UE-to-Network Relay UE needs to be aware of the mapping between evolved ProSe Remote UE identities on the short range link and on Uu interface.

The RRC connected remote UE may be allocated with local identifier with reconfiguration procedure. However, the remote UE in RRC idle may not allocated with local identifier prior to connecting to network via the relay UE so that the network cannot identify the remote UE. A new process is needed to generate a local identifier that identifies the remote UE that is used between the relay UE and the network.

Figure 9A:
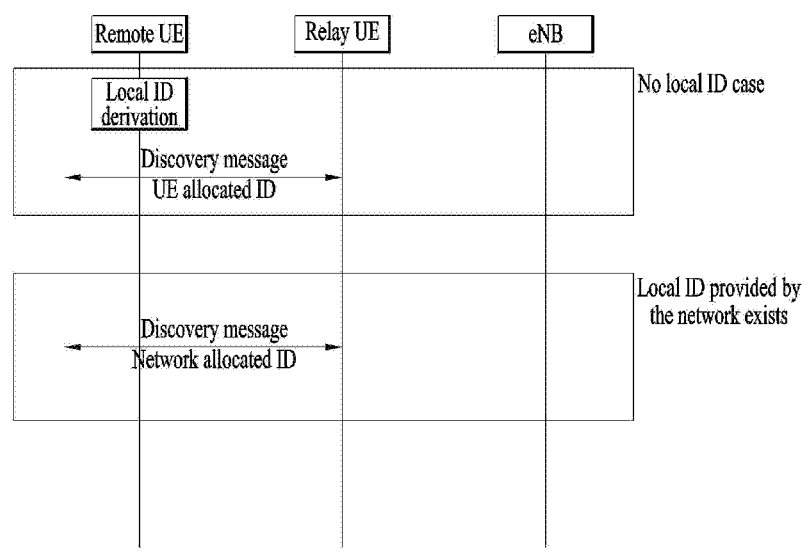
FIGS. 9A to 9C are conceptual diagrams for performing management of local ID identifying a remote UE in the remote UE in wireless communication system according to embodiments of the present invention.
Figure 9B:
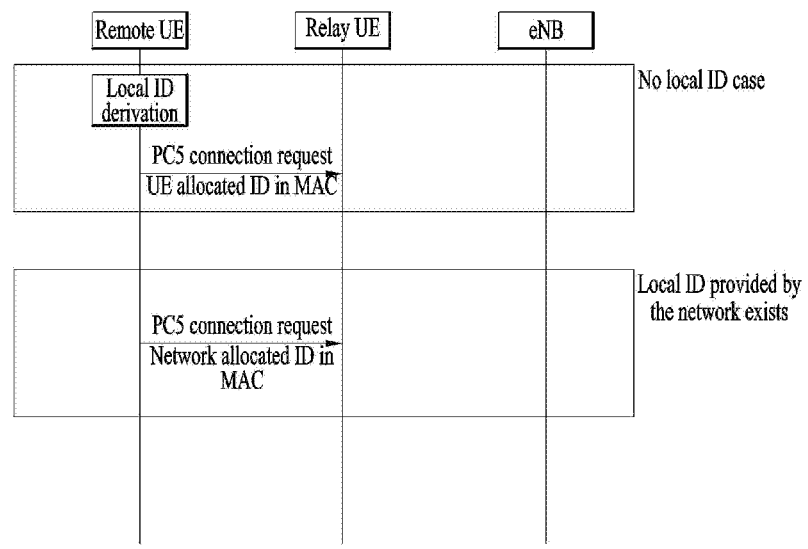
Figure 9C:
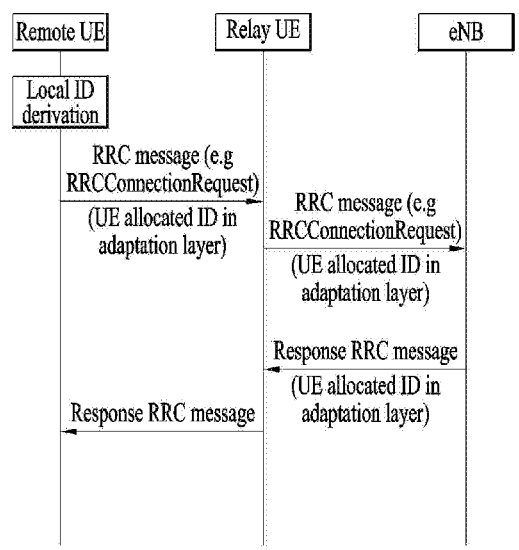

FIGS. 9A to 9C are conceptual diagrams for performing management of local ID identifying a remote UE in the remote UE in wireless communication system according to embodiments of the present invention.

It is assumed that the local ID is used for identifying the remote UE between the relay UE and the network.

If there is no local identifier provided by the network, the remote UE considers the followings as its local identifier:

1. If there is any identifier (other than local identifier) allocated by the network (e.g. this case means that the remote UE has never connected to the network), the remote UE considers part of the identifier as its local identifier. The example of the already network allocated identifier is C-RNTI, resume identity, S-TMSI, ProSe UE ID and other network allocated identifier, or 2. If there is no network allocated identifier, the UE considers part of the random value included in RRC connection request message as its local identifier, or 3. In case of non-3GPP short link, part of RAT specific address (e.g. MAC address) of the remote UE is considered as its local identifier.

The remote UE derives the local identifier from the network allocated identifier, the random value or the RAT specific identifier as follows as examples:

1. The network allocated identifier, the random value or the RAT specific identifier as it is, or 2. A certain number of LSBs (least significant bits) or MSBs (most significant bits) of the network allocated identifier, the random value or the RAT specific identifier, or 3. Hash function values of the certain number of LSBs (least significant bits) or MSBs (most significant bits) of the network allocated identifier, the random value or the RAT specific identifier.

The remote UE can derive the local identifier i) during the discovery procedure, ii) during making link between the remote UE and the relay UE (e.g. PC5 connected), iii) after linking, when the remote UE sends RRC message (e.g. RRC connected request message) to the network via the relay UE.

FIG. 9A is for deriving a local ID by the remote UE during discovery procedure.

During the discovery procedure, the remote UE derives the local identifier if there is no local identifier provided by the network. Then, the remote UE includes the local identifier in the discovery message. Otherwise, the UE includes the local identifier provided by the network in the discovery message.

FIG. 9B is for deriving a local ID by the remote UE during making link between the remote UE and the relay UE (e.g. PC5 connection).

During making link between the remote UE and the relay UE (e.g. PC5 connection), the remote UE derives the local identifier if there is no local identifier provided by the network. When the UE derives the local identifier, the remote UE includes the derived local ID as an source identity in the MAC (sub)header.

Alternatively, during making link between the remote UE and the relay UE, the remote UE includes the derived local ID in the PC5 connection request message if there is no local identifier provided by the network. In this case, as an source identity in the MAC (sub)header, the remote UE uses ProSe UE ID.

If the relay UE knows the remote UE's local identifier, the relay UE adds the remote UE's local identifier in the header of the adaption layer for forwarding the remote UE's message to the network. Then, the network also adds the remote UE's local identifier in the header of the adaption layer for sending the message destined to the remote UE.

FIG. 9C is for deriving a local ID by the remote UE when the remote UE sends the message to the network via the relay UE after linking.

After linking, when the remote UE sends RRC message (e.g. RRC connected request message) to the network via the relay UE, the remote UE derives the local identifier if there is no local identifier provided by the network. When the UE derives the local identifier, the remote UE includes the derived ID in header of adaption layer (alternatively, the remote UE includes the derived ID in source identity in (sub)header of MAC layer) and the relay UE also includes the received local ID which identifies the remote UE in header of adaption layer. Then, the network also adds the remote UE's local identifier in the header of the adaption layer for sending the message destined to the remote UE.

If the remote UE derives the local identifier, the remote UE includes the derived local identifier in the source identity in (sub)header in MAC layer. Alternatively, the remote UE includes the derived local identifier in header added by the adaption layer. Alternatively, the remote UE provides the derived local identifier to the relay UE during making link with the relay UE or discovery procedure.

Preferably, the above derivation of the local identifier can be done when the remote UE is in RRC IDLE or RRC CONNECTED.

If the relay UE derives the local identifier, the relay UE includes in header added by the adaption layer. If the relay UE or network become aware that there are two same local identifiers which is derived by the remote UE, the relay UE or network responds to the relay UE with the new suggested local identifier and the local identifier derived by the remote UE.

If the network does not release local identifier of the remote UE, the remote UE removes it when transiting to RRC IDLE.

Figure 10:
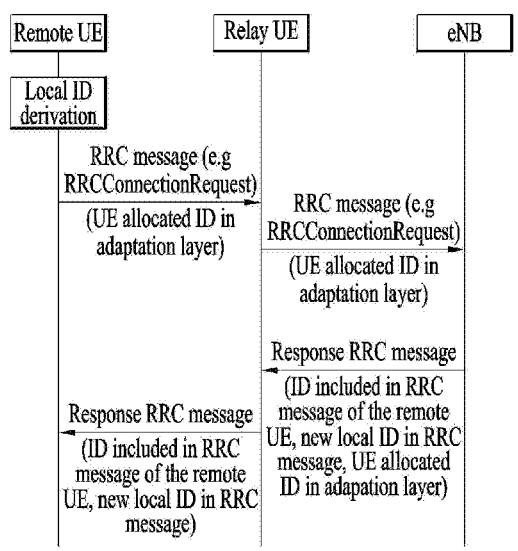
FIG. 10 is a conceptual diagram for performing management of local IDs at contention of local IDs derived by the remote UE in wireless communication system according to embodiments of the present invention.

FIG. 10 is a conceptual diagram for performing management of local IDs at contention of local IDs derived by the remote UE in wireless communication system according to embodiments of the present invention.

When the eNB receives local identifiers from a plurality of UEs, if the received local identifier is used by the another UE (e.g. contention of local IDs), the network adds the received identifier (e.g. C-RNTI in RRC re-establishment request message, S-TMSI or random value in RRC connection request message) and a new suggested local identifier in RRC message and adds the remote UE's local identifier in the header of the adaption layer for sending the message destined to the remote UE. Then, the remote UE sends the received RRC message to the UEs which has the local identifier included in adaption layer.

After receiving the RRC message including the suggested ID, the remote UE knows whether the message is destined to itself by matching the transmitted identifier (e.g. C-RNTI in RRC re-establishment request message, S-TMSI or random value in RRC connection request message) and received identifier. If the message is destined to itself, the remote UE uses the new local ID allocated by the network.

Figure 11:
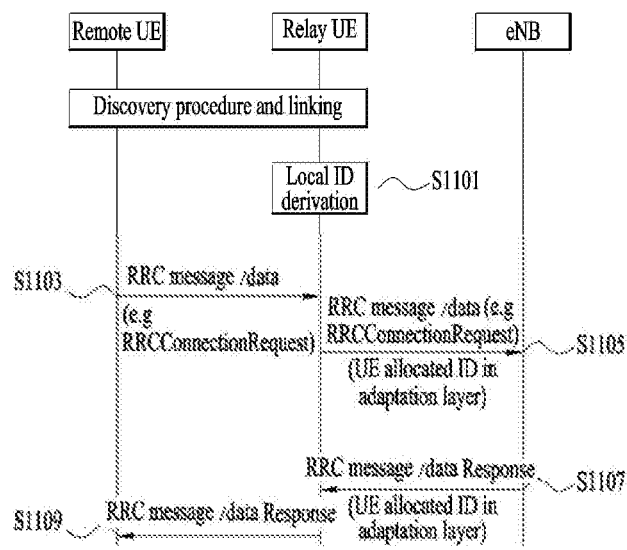
FIG. 11 is a conceptual diagram for performing management of local ID identifying a remote UE and a relay UE itself in the relay UE in wireless communication system according to embodiments of the present invention.

FIG. 11 is a conceptual diagram for performing management of local ID identifying a remote UE and a relay UE itself in the relay UE in wireless communication system according to embodiments of the present invention.

If there is no local identifier provided by the network, the relay UE considers the followings as its local identifier:

1. If there is any remote UE's identifier (other than local identifier) allocated by the network previously (e.g. this case means that the remote UE does not have RRC connection with the network), the relay UE considers part of the identifier as its local identifier. The example of the already network allocated identifier is C-RNTI, resume identity, S-TMSI, ProSe UE ID and other network allocated identifier, or 2. If there is no network allocated identifier for the remote UE, the relay UE considers part of the random value included in RRC connection request message as its local identifier, or 3. In case of non-3GPP short link, part of RAT specific address (e.g. MAC address) of the remote UE is considered as its local identifier.

The relay UE derives the local identifier of the remote UE and/or the relay UE from the network allocated identifier, the random value or the RAT specific identifier as follows as examples:

1. The network allocated identifier, the random value or the RAT specific identifier as it is, or 2. A certain number of LSBs (least significant bits) or MSBs (most significant bits) of the network allocated identifier, the random value or the RAT specific identifier, or 3. Hash function values of the certain number of LSBs (least significant bits) or MSBs (most significant bits) of the network allocated identifier, the random value or the RAT specific identifier.

The relay UE can derive the local identifier i) during the discovery procedure, and ii) during making link between the remote UE and the relay UE (e.g. PC5 connected) from a network allocated identifier which is obtained during discovery procedure and making link.

When a local identifier of the remote UE is derived by the relay UE, the derivation is based on the RAT specific identifier known during discovery or link establishment procedure. For instance, 8 bits of LSBs of MAC address of the remote UE or ProSe UE ID is used as the local identifier of the remote UE. Alternatively, the random value is allocated for the remote UE (S1101) (e.g. in case the relay UE is aware of collision between different remote UE's local identifiers).

After above procedure, if the relay UE receives a RRC message (e.g. RRC connection request) from the remote UE (S1103), the relay UE relays the RRC message for the remote UE using the derived local ID to the eNB (S1105). More specifically, the relay UE includes the received local ID which identifies the remote UE in header of adaption layer. In addition, if there are any RRC messages of the relay UE itself, the relay UE relays the RRC message for the relay UE using the derived local ID to the eNB. More specifically, the relay UE includes the received local ID which identifies the relay UE in header of adaption layer.

Then, the network also adds the remote UE's local identifier in the header of the adaption layer for sending a RRC message (e.g. response RRC message) and/or any data destined to the remote UE (S1107). Furthermore, the network adds the relay UE's local identifier in the header of the adaption layer for sending a RRC message and/or any data destined to the relay UE if there are any RRC messages/data destined to the relay UE.

The relay UE also relays to the remote UE the RRC message/data received from the eNB (S1109).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a relay user equipment (UE) operating in a wireless communication system, the method comprising:
generating a local identifier (ID) identifying a remote UE of which transmits/receives data to/from an eNodeB (eNB) via the relay UE, wherein the generated local ID is derived from Radio Access Technology (RAT) specific ID which is acquired during discovery procedure and linking process between the remote UE and the relay UE;
receiving a first message from the remote UE; and
transmitting the first message for the remote UE using the generated local ID to the eNB.

2. The method according to claim 1, wherein the generated local ID is a certain number of least significant bits (LSBs) or most significant bits (MSBs) of the RAT specific ID.

3. The method according to claim 1, wherein when the first message is received from the remote UE, the relay UE adds the generated local ID in a header of an adaption layer and transmits the first message to the eNB.

4. The method according to claim 1, further comprising:
receiving a second message for the remote UE by including the generated local ID in a header of an adaption layer; and
relaying the second message to the remote UE which is identified by the generated local ID included in the second message transmitted by the eNB.

5. The method according to claim 4, wherein the first message and the second message are Radio Resource Control (RRC) message or user plane message.

6. A relay user equipment (UE) operating in a wireless communication system, the UE comprising:
a Radio Frequency (RF) module; and
a processor operably coupled with the RF module and configured to:

generate a local identifying (ID) identifying a remote UE of which transmits/receives data to/from an eNodeB (eNB) via the relay UE, wherein the generated local ID is derived from Radio Access Technology (RAT) specific ID which is acquired during discovery procedure and linking process between the remote UE and the relay UE;

receive a first message from the remote UE; and transmit the first message for the remote UE using the generated local ID to the eNB.

7. The relay UE according to claim 6, wherein the generated local ID is a certain number of least significant bits (LSBs) or most significant bits (MSBs) of the RAT specific ID.

8. The relay UE according to claim 6, wherein when the first message is received from the remote UE, the relay UE adds the generated local ID in a header of an adaption layer and transmits the first message to the eNB.

9. The relay UE according to claim 6, wherein the processor is further configured to:

receive a second message for the remote UE by including the generated local ID in a header of an adaption layer; and relay the second message to the remote UE which is identified by the generated local ID included in the second message transmitted by the eNB.

10. The relay UE according to claim 9, wherein the first message and the second message are Radio Resource Control (RRC) message or user plane message.

* * * * *